(12) United States Patent
Yagi

(10) Patent No.: US 6,421,436 B1
(45) Date of Patent: Jul. 16, 2002

(54) MULTILINE TELEPHONE APPARATUS

(75) Inventor: Hisashi Yagi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/496,663

(22) Filed: Feb. 3, 2000

(30) Foreign Application Priority Data

Feb. 5, 1999 (JP) ............................................. 11-028254

(51) Int. Cl.$^7$ ........................... H04M 1/00; H04M 1/57; H04M 11/00; H04M 15/06
(52) U.S. Cl. ................. 379/157; 379/93.07; 379/93.23; 379/142.04; 379/142.07; 379/164; 379/165; 379/354
(58) Field of Search ........................... 379/93.05, 93.06, 379/93.07, 93.23, 142.01, 142.04, 142.07, 142.13, 156, 157, 164, 165, 354

(56) References Cited

U.S. PATENT DOCUMENTS 5,550,905 A * 8/1996 Silverman ............... 379/142.07
6,304,644 B2 * 10/2001 Karnowski ................... 379/157

FOREIGN PATENT DOCUMENTS

JP 10-13653 1/1998 ............ H04N/1/32

* cited by examiner

*Primary Examiner*—Harry S. Hong
(74) *Attorney, Agent, or Firm*—Wenderoth, Lind & Ponack, L.L.P.

(57) ABSTRACT

A multiline telephone apparatus with caller ID signal detecting function had an expensive modem for demodulating the caller ID in each one of telephone lines. According to the invention of the present application, each line is provided with a signal detecting circuit for detecting a channel seizure signal or carrier signal in the caller ID signal, and the input line to the modem for caller ID demodulation is changed over depending on the detection output of these signal detecting circuits, so that the caller ID signals of a plurality of lines can be demodulated by one modem only. As a result, a simple and inexpensive multiline telephone apparatus with caller ID signal detecting function is realized.

12 Claims, 3 Drawing Sheets

MULTILINE TELEPHONE APPARATUS

FIELD OF THE INVENTION

The present invention relates to a multiline telephone apparatus having a caller ID signal detecting function.

BACKGROUND OF THE INVENTION

Prior Art

Below is explained a conventional multiline telephone apparatus with a caller ID (bell core system) signal detecting function connected to a plurality of telephone lines.

First, the caller ID signal is described. As shown in FIG. 3, the caller ID signal is transmitted in a silent portion between first and second bell incoming signals as being modulated in FSK (frequency shift keying) system of CCITT V.23.

The caller ID signal is composed of a channel seizure signal which issues logic 1 (1200 Hz) and logic 0 (2200 Hz) alternately, a carrier signal portion holding logic 1 (1200 Hz) for 150 ms continuously, and a data signal portion of 175 ms showing caller's telephone number, call time and other data. FIG. 3 is an example of signal upon bell incoming, but in voice mail service or the like, there is no bell incoming signal, and only the caller ID signal shown in FIG. 3 is transmitted.

FIG. 2 is a block diagram of a conventional multiline telephone apparatus with caller ID signal detecting function.

First, the operation of the voice system of the multiline telephone apparatus is explained. When the talk in telephone line B($1a'$–$1b'$) is selected by input means not shown, a switch 16 is set at lower (b) side, and by unhooking the handset, telephone line closing means 3 is turned on, and the handset talk circuit between the handset and the telephone line B is formed. The receiving sound signal from the telephone line B is transferred in the sequence of diode bridge 2', switch 16, telephone line closing means 3, side tone suppression circuit 5, receiving amplifier 8, and handset speaker 10. The transmitting sound is transferred in the sequence of handset microphone 11, transmitting amplifier 9, line send-out amplifier 4, telephone line closing means 3, switch 16, and diode bridge 2', and is sent out to the telephone line B.

The operation of the caller ID signal system is explained. Incoming signals from telephone line A($1a$–$1b$) and telephone line B($1a'$–$1b'$) are put into coupling capacitors $6a$ and $6b$, or $6a'$ and $6b'$ where DC components of signals are cut off, and are amplified respectively in differential amplifiers 7, 7', and put into caller ID demodulation modems 12, 12'. The caller ID signal of each telephone line is demodulated in the caller ID demodulation modems 12, 12', and data of telephone number and others are output. The demodulated output data are put into a controller 17, and are displayed in LCD or other display device not shown.

Problems that the Invention is to Solve

However, such conventional multiline telephone apparatus with caller ID signal detecting function requires modems for caller ID demodulation in individual telephone lines. The modems are very expensive, which is a bottleneck for reduction of cost.

Some of the conventional multiline telephone apparatuses with caller ID signal detecting function employ a method of detecting the bell incoming signal, changing over the telephone line, and feeding into the modem in order to operate by one modem only. Recently, aside from the service of noticing the telephone number data by sending a caller ID signal between first and second bell incoming signals (FIG. 3), in the voice mail service, the voice mail data telling that the message has been recorded in the voice mail is sent only by using the caller ID signal regardless of the bell incoming signal. More recently, there is a caller ID service corresponding to call waiting to inform of a call from a third party during talk, and in this case, too, the caller ID signal is sent alone. Therefore, it is no longer possible to cope with the system of changing over the input to the modem by detecting the bell incoming signal.

The invention is intended to improve the subjects mentioned above, and it is hence an object thereof to present a multiline telephone apparatus capable of processing caller ID signals of a plurality of telephone lines by one demodulation modem alone.

SUMMARY OF THE INVENTION

Means of Solving the Problems

To achieve the object, the invention provides a multiline telephone apparatus having a plurality of caller ID signal detecting circuits for detecting the channel seizure signal or carrier signal in the caller ID signal, in order to change over a plurality of telephone line inputs to a caller ID demodulation modem.

The invention hence realizes a multiline telephone apparatus capable of processing caller ID signals of a plurality of telephone lines by one demodulation modem only.

DETAILED DESCRIPTION OF THE PREFERRED EMBODIMENT

[Embodiment of the Invention]

An embodiment of the invention is described below while referring to the accompanying drawing.

(Embodiment)

Figure 1:
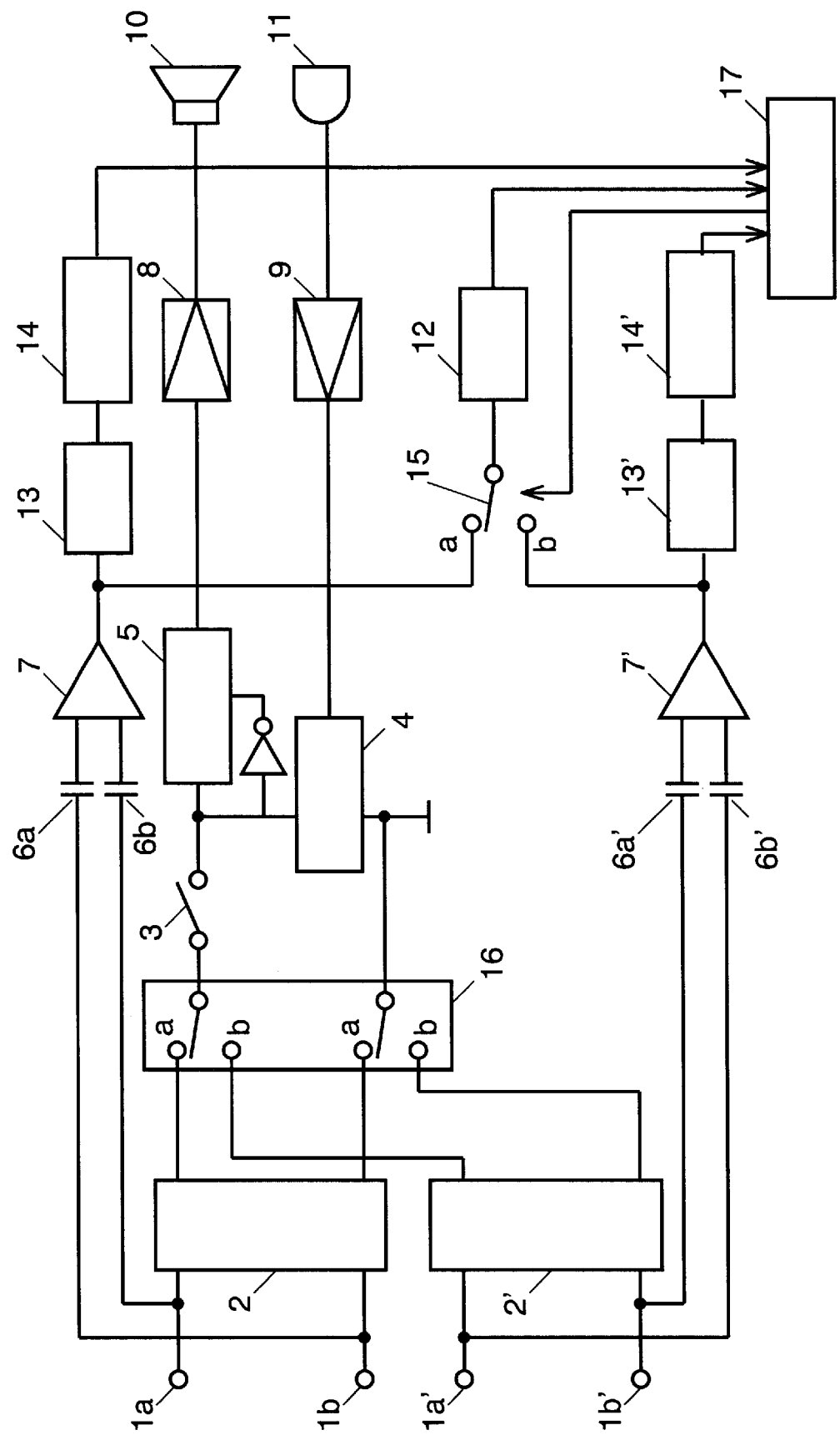
FIG. 1 is a block diagram of a multiline telephone apparatus according to an embodiment of the invention.
Figure 2:
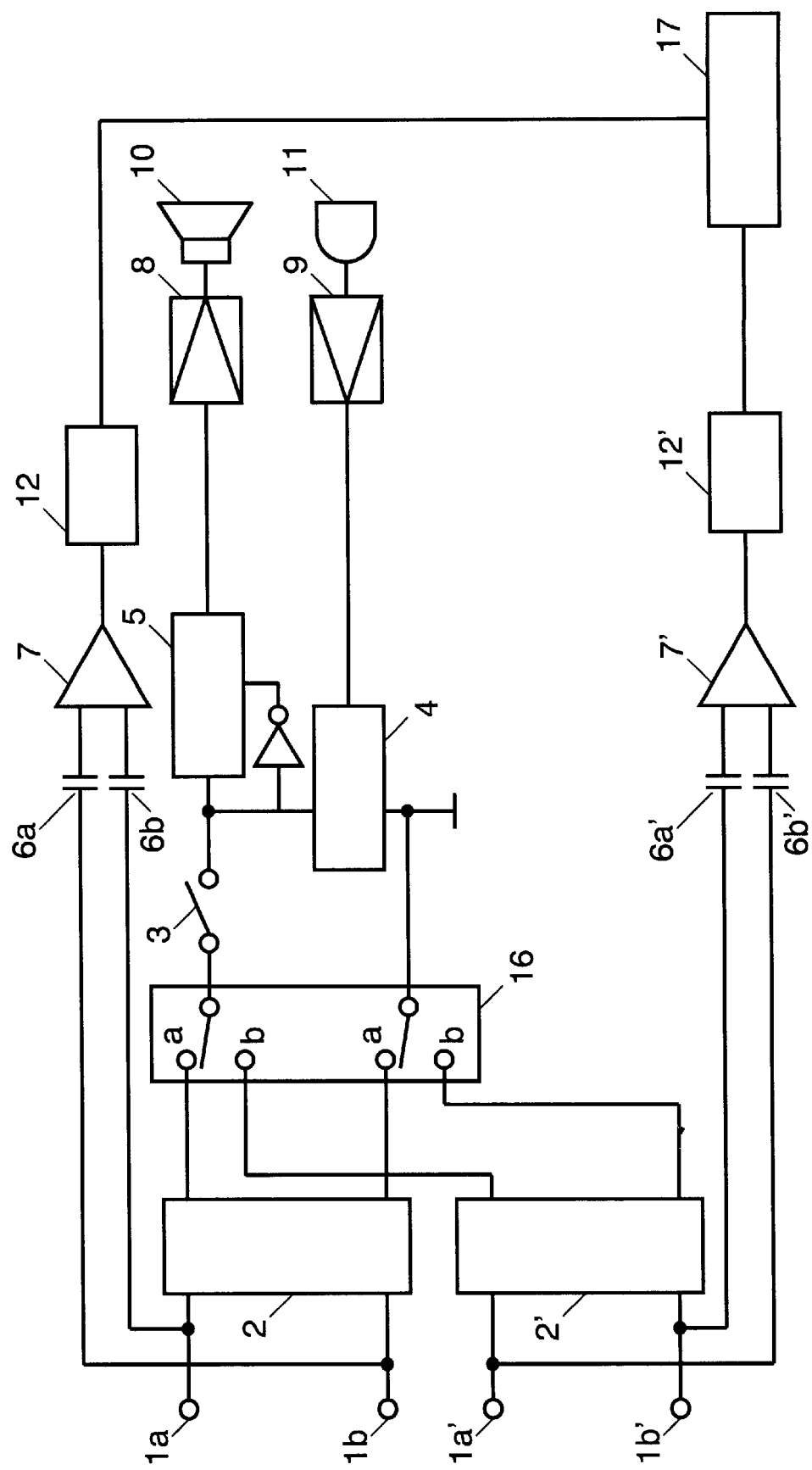
FIG. 2 is a block diagram of a conventional multiline telephone apparatus.
Figure 3:
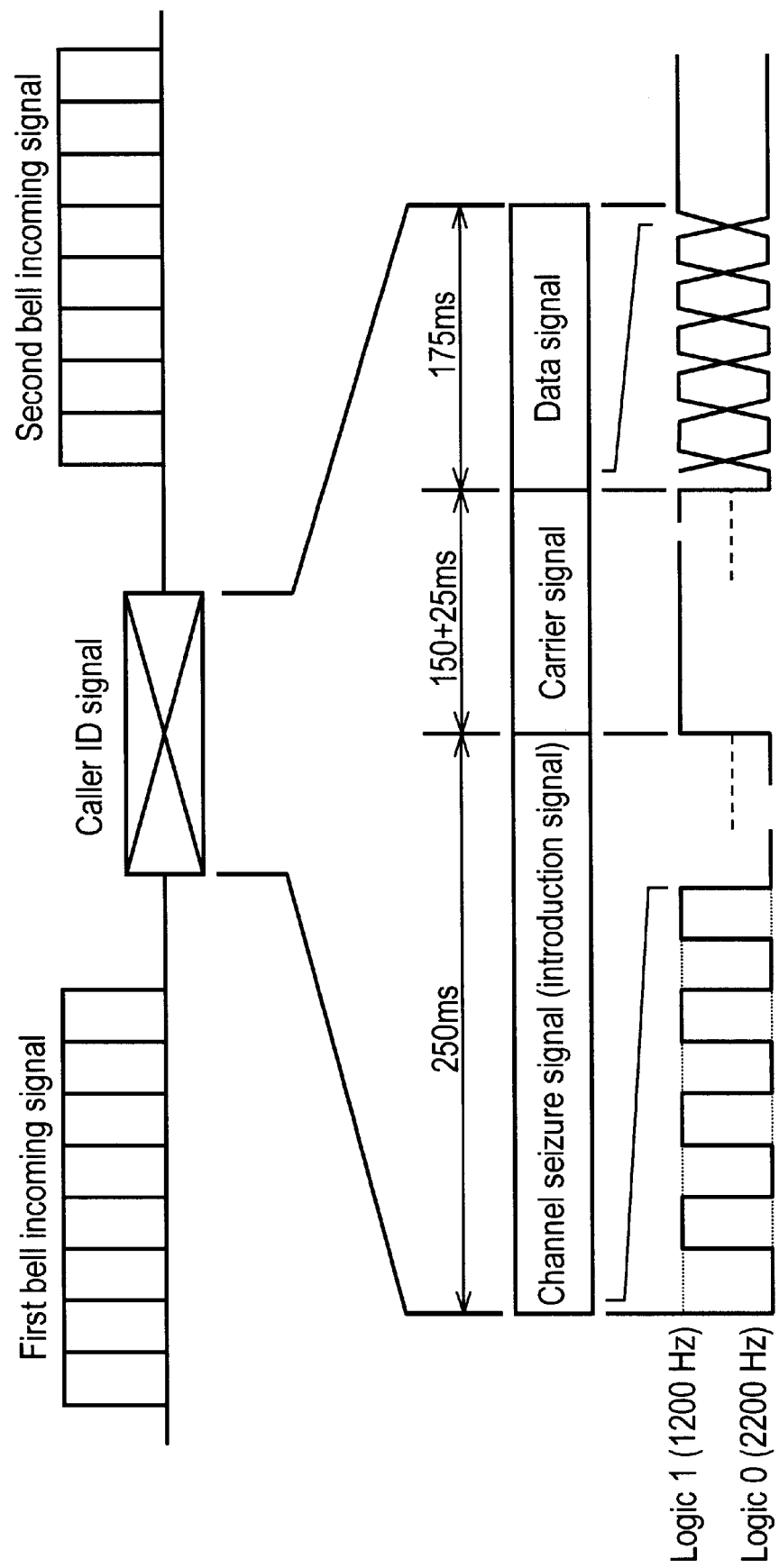
FIG. 3 is an explanatory diagram of caller ID signal.

FIG. 1 is a block diagram of a multiline telephone apparatus according to an embodiment of the invention. In FIG. 1, the same parts as in the prior art in FIG. 2 are identified with same reference numerals.

The operation of the voice system is same as in the prior art, and its explanation is omitted.

The operation of the caller ID signal system is described below. Incoming signals from telephone line A($1a$–$1b$) and telephone line B($1a'$–$1b'$) are put into coupling capacitors $6a$ and $6b$, or $6a'$ and $6b'$ where DC components of signals are cut off, and are amplified respectively in differential amplifiers 7, 7'. Output signals from the differential amplifiers 7, 7' are fed into band pass filters (BPF) 13, 13', which pass characteristic component 1200 Hz or 2200 Hz, or both contained in the caller ID signals. In the outputs of the band pass filters 13, 13', if a signal over a specific level continues for more than a specific time, it may be judged to be a caller ID signal, and it is converted by comparators 14, 14' into logic level 1, for example, +5 V, and output.

A controller 17 monitors the outputs of the comparators 14 and 14', and changes over a line changeover switch 15 to (a) side when the logic level 1 is output from the comparator 14, or changes over the line changeover switch 15 to (b) side when the logic level 1 is output from the comparator 14'. Passing through the line changeover switch 15, the caller ID signal is put into a caller ID demodulation modem 12, and is demodulated into telephone number data or the like, and is output. The demodulated output data is put into the controller 17, and is displayed in a display device such as LCD not shown. That is, whether a caller ID signal is entered or not from the telephone line A or telephone line B is always monitored by the controller 17 on the basis of the output from the comparator 14 or 14'. When a caller ID signal is entered, the controller 17 changes over the line changeover switch 15 to the telephone line side to which the caller ID signal is entered, and feeds into the caller ID demodulation modem 12.

Effects of the Invention

As clear from the description herein, according to the invention, since caller ID signals from a plurality of telephone lines connected to the telephone set can be demodulated by one modem, a very inexpensive multiline telephone apparatus can be presented. Moreover, since input to the modem is changed over by detecting the caller ID signal, the caller ID signal independent of the bell incoming signal such as in voice mail service or call waiting service can be received without fail.

The illustrated embodiment of the invention is an example about caller ID service in ordinary telephone incoming time, but same effects are obtained in the caller ID service corresponding to the voice mail or call waiting. Or, when one telephone line is busy, the input to the modem may be set to the busy telephone line side, and when a caller ID signal is fed into a free line side, the same effects are obtained by changing over the line changeover switch 15 to the free line side.

The embodiment of the invention relates to two lines, but it may be similarly applied to more lines.

In the embodiment, the caller ID signal is detected by the level and it's time duration of 1200 Hz or 2200 Hz, or both signals, but it may be also detected by the pulse width or number of pulses of FSK pulse signal of channel seizure signal (introduction signal), or time duration of carrier signal portions, or combination thereof.

This is explained as the multiline telephone apparatus, but the features of the invention are not lost in the case of the apparatus with exchange functions.

What is claimed is:

1. A multiline telephone apparatus comprising:
   a plurality of line interfaces each connected to a plurality of telephone lines,
   a plurality of signal detecting circuits connected to said line interfaces for detecting a channel seizure signal or carrier signal in caller ID signals out of incoming signals from telephone lines,
   a modem for demodulating incoming caller ID signals, and
   changeover means for changing over the input of said modem to the telephone line of the line interface side connected to the signal detecting circuit which has detected the signal.

2. The multiline telephone apparatus of claim 1, wherein said plurality of line interfaces are a first line interface connected to a first telephone line and a second line interface connected to a second telephone line, and said signal detecting circuits are a first detecting circuit connected to the first line interface for detecting a channel seizure signal or carrier signal in the caller ID signals among incoming signals from the first telephone line, and a second detecting circuit connected to the second line interface for detecting a channel seizure signal or carrier signal in the caller ID signals among incoming signals from the second telephone line.

3. The multiline telephone apparatus of claim 2, wherein said changeover means is composed of a line changeover switch for changing over said plurality of line interfaces and input of said modem, and control means for controlling said line changeover switch depending on the detection output of said plurality of signal detecting circuits.

4. The multiline telephone apparatus of claim 1, wherein said signal detecting circuits are signal detecting circuits for detecting a signal of a specific frequency component contained in the channel seizure signal or carrier signal in the caller ID signals.

5. The multiline telephone apparatus of claim 4, wherein said changeover means is composed of a line changeover switch for changing over said plurality of line interfaces and input of said modem, and control means for controlling said line changeover switch depending on the detection output of said plurality of signal detecting circuits.

6. The multiline telephone apparatus of claim 1, wherein said changeover means is composed of a line changeover switch for changing over said plurality of line interfaces and input of said modem, and control means for controlling said line changeover switch depending on the detection output of said plurality of signal detecting circuits.

7. The multiline telephone apparatus of claim 2, wherein said signal detecting circuits are signal detecting circuits for detecting a signal of a specific frequency component contained in the channel seizure signal or carrier signal in the caller ID signals.

8. A multiline telephone apparatus comprising:
   a first line interface connected to a first telephone line,
   a second line interface connected to a second telephone line,
   a first band pass filter circuit connected to the first line interface for passing a specific frequency component contained at the beginning of a caller ID signal sent through the first telephone line,
   a second band pass filter circuit connected to the second line interface for passing a specific frequency component contained at the beginning of a caller ID signal sent through the second telephone line,
   a modem for demodulating a caller ID signal among entered caller ID signals,
   a line changeover switch for changing over the caller ID signal from the first telephone line or the caller ID signal from the second telephone line, and feeding into said modem, and
   control means for monitoring the signal passing through the first band pass filter and the signal passing through the second band pass filter, detecting the input of caller ID, recognizing whether it is from the first telephone line or second telephone line, and controlling said line changeover switch according to this result.

9. The multiline telephone apparatus of claim 8, further comprising telephone receiving and transmitting means including a switch for changing over between a path of talk by using the first telephone line and a path of talk by using the second telephone line, a receiving amplifier for amplifying the receiving voice signal, and a transmitting amplifier for amplifying the transmitting voice signal.

10. The multiline telephone apparatus of claim 9, wherein a first comparator and a second comparator for converting the output signal into a logic level are built in said first band pass filter circuit and second band pass filter circuit, respectively.

11. The multiline telephone apparatus of claim 8 wherein a first comparator and a second comparator for converting the output signal into a logic level are built in said first band pass filter circuit and second band pass filter circuit, respectively.

12. A multiline telephone apparatus comprising:

first converting means for converting the polarity of a first telephone line, second converting means for converting the polarity of a second telephone line, a switch for changing over between a path of talk by using the first telephone line and a path of talk by using the second telephone line, telephone line closing means for closing or opening the telephone line, a line send-out amplifier for sending out voice to the line, a side tone suppression circuit for inverting the transmitting signal and summing up with the receiving signal from the line, a receiving amplifier for amplifying the receiving voice signal, a transmitting amplifier for amplifying the transmitting voice signal, a speaker, a microphone, a first preamplifier for amplifying the output of the first converting means, a second preamplifier for amplifying the output of the second converting means, a first band pass filter connected to the first preamplifier for passing a specific frequency component contained at the beginning of a caller ID signal sent through the first telephone line, a second band pass filter connected to the second preamplifier for passing a specific frequency component contained at the beginning of a caller ID signal sent through the second telephone line, a first comparator for converting the signal passing through the first band pass filter into a logic level, a second comparator for converting the signal passing through the second band pass filter into a logic level, a modem for demodulating the caller ID signal, a line changeover switch for changing over the caller ID signal from the first telephone line or the caller ID signal from the second telephone line, and feeding into said modem, and control means for monitoring the both outputs of the first comparator and second comparator, detecting the input of the caller ID, recognizing whether it is from the first telephone line or second telephone line, and controlling said line changeover switch according to this result.

* * * * *